(12) United States Patent
Sohn et al.

(10) Patent No.: US 12,173,147 B2
(45) Date of Patent: Dec. 24, 2024

(54) FLUOROPOLYMER, FLUOROPOLYMER COMPOSITION CONTAINING SAME, AND FLUOROPOLYMER FILM USING SAME

(71) Applicant: KOREA RESEARCH INSTITUTE OF CHEMICAL TECHNOLOGY, Daejeon (KR)

(72) Inventors: Eun-Ho Sohn, Daejeon (KR); In Joon Park, Daejeon (KR); Soo Bok Lee, Daejeon (KR); Jong-Wook Ha, Daejeon (KR)

(73) Assignee: Korea Research Institute Of Chemical Technology, Daejeon (KR)

( * ) Notice: Subject to any disclaimer, the term of this patent is extended or adjusted under 35 U.S.C. 154(b) by 794 days.

(21) Appl. No.: 16/913,016

(22) Filed: Jun. 26, 2020

(65) Prior Publication Data

US 2020/0385563 A1  Dec. 10, 2020

Related U.S. Application Data

(63) Continuation-in-part of application No. PCT/KR2018/016329, filed on Dec. 20, 2018.

(30) Foreign Application Priority Data

Dec. 26, 2017  (KR) ........................ 10-2017-0179571
Nov. 19, 2018  (KR) ........................ 10-2018-0142481

(51) Int. Cl.
| | | |
|---|---|---|
| *C08L 27/12* | (2006.01) | |
| *C08F 220/06* | (2006.01) | |
| *C08F 220/14* | (2006.01) | |
| *C08L 33/10* | (2006.01) | |
| *C08K 5/1535* | (2006.01) | |
| *C08K 5/23* | (2006.01) | |

(52) U.S. Cl.
CPC ............ *C08L 33/10* (2013.01); *C08F 220/06* (2013.01); *C08F 220/14* (2013.01); *C08K 5/1535* (2013.01); *C08K 5/23* (2013.01); *C08L 2203/16* (2013.01)

(58) Field of Classification Search
CPC ...... C08L 33/10; C08L 2203/16; C08L 33/02; C08L 33/066; C08L 33/08; C08L 33/16; C08F 220/06; C08F 220/14; C08F 220/24; C08F 220/18; C08F 220/20; C08K 5/1535; C08K 5/23; C09D 133/16; B32B 27/08; C08J 5/18; G02B 1/04
See application file for complete search history.

(56) References Cited

FOREIGN PATENT DOCUMENTS

| | | | |
|---|---|---|---|
| JP | 2002097338 A | 4/2002 | |
| JP | 2006063132 A | 3/2006 | |
| JP | 2012-177111 A | 9/2012 | |
| JP | 2013173840 A | 9/2013 | |
| KR | 101212572 B1 | 12/2012 | |
| WO | WO-2017216201 A1 | 12/2017 | |
| WO | WO-2018033913 A1 * | 2/2018 | ............ B01J 13/185 |

OTHER PUBLICATIONS

English translation of JP2013173840 provided by PatentScope on Apr. 18, 2023.*
English translation of JP2006063132 provided by Espacenet on Apr. 18, 2023.*
Zixu GU et al. "Surface energy and surface reorganization of perfluorohexylethyl methacrylate/n-alkyl (meth)acrylate copolymers" Colloids and Surfaces A: Physicochem. Eng. Aspects 502 (2016) 159-167.
International Search Report for PCT/KR2018/016329 Dated Mar. 18, 2019.

* cited by examiner

*Primary Examiner* — Jessica Worsham
(74) *Attorney, Agent, or Firm* — Harness, Dickey & Pierce, P.L.C.

(57) ABSTRACT

In an aspect of the present invention, a fluoropolymer represented by formula 1 is provided. The fluoropolymer provided in one aspect of the present invention can obtain low surface energy and high light transmittance, and thus can be applied to various applications requiring such properties. In particular, when the fluoropolymer is coated on glass, the surface energy can be lowered to 19 mN/m or less and the light transmittance can be increased by 2% or more. At the same time, it has the effect of exhibiting excellent pencil hardness. In addition, the fluoropolymer provided in one aspect of the present invention can be applied as a surface coating and membrane material of various products due to its high solubility in general organic solvents, despite having very low surface energy during coating. Furthermore, the fluoropolymer has excellent adhesive power to the substrate surface and is capable of hardening, so it can be applied to various fields such as automotive glass, building exterior materials, condensers in fresh water or power plants, and solar cells.

10 Claims, 2 Drawing Sheets

FLUOROPOLYMER, FLUOROPOLYMER COMPOSITION CONTAINING SAME, AND FLUOROPOLYMER FILM USING SAME

CROSS-REFERENCES TO RELATED APPLICATION

This patent application claims the benefit of priority from PCT international application No. PCT/KR2018/016329 filed on Dec. 20, 2018, the contents of which are incorporated herein by reference.

BACKGROUND OF THE INVENTION

1. Field of the Invention

The present invention relates to a fluoropolymer, a fluoropolymer composition containing the same, and a fluoropolymer film using the same.

2. Description of the Related Art

Fluorine has a high electron density, a small atomic radius after a hydrogen atom, and a strong electronegativity, thereby forming a solid carbon-fluorine bond. Due to these characteristics of fluorine, the monomer containing a perfluorinated alkyl group exhibits a superhydrophobicity with a critical surface tension of 6-8 dynes/cm, and the surface energy is also very low to repel both water and oil. The fluorine-based compound has excellent chemical stability, heat resistance, weather resistance, non-stickiness, low surface energy, water repellency, and low refractive index, thus, it is gradually expanding its applications despite its relatively high price.

Currently, the fluorine-based functional material exhibits excellent performance that other materials cannot realize in terms of contamination resistance, weather resistance, heat resistance, and optical properties. Therefore, it is widely used as a key material for next-generation technologies in the high-tech industries such as optical communications, optoelectronics, semiconductors, automobiles, and computers. In particular, research on the fluorine-based functional material has been actively conducted as interest in antipollution coating of various paints and coating agents has increased in the areas of household appliances, architecture, shipbuilding, and civil engineering, which require traditional antipollution surface properties, including antipollution coating of the front outermost layer of liquid crystal displays or the frames of beautiful displays.

Fluoropolymers are substances that have properties such as low surface energy, water repellency, lubricity, and low refractive index, along with excellent heat resistance, chemical resistance and weather resistance, and have been widely used throughout the industry including household products.

However, in the case of the conventional fluoropolymers, despite the excellent performance (water repellency, pollution prevention, etc.), the material cost is high, and the use of general organic solvents is mostly difficult, so problems in the manufacturing process have emerged largely.

In addition, depending on the type of the substrate, problems such as poor adhesion have occurred. That is, if the performance of the fluoropolymer is maintained, and it is soluble in a general organic solvent and has excellent adhesion to a substrate for use as a coating material, the industrial value seems to be great.

In order to solve the above-mentioned problems, the present inventors have developed a multifunctional fluoropolymer having similar or better surface energy and light transmittance to the conventional fluoropolymer, exhibiting excellent pencil hardness, adhesion to a substrate, coating stability, and solubility in a general organic solvent. The present inventors completed the present invention by confirming that the developed fluoropolymer has the above functions.

PRIOR ART REFERENCE

Patent Reference

Japanese Patent Publication No. JP 2012-177111 A

Non-Patent Reference

Colloids and Surfaces A: Physicochem. Eng. Aspects 502 (2016) 159-167

SUMMARY OF THE INVENTION

It is an object of the present invention to provide a fluoropolymer having high pencil hardness and simultaneously having low surface energy and excellent solubility in a general organic solvent and adhesion to a substrate surface and a fluoropolymer film using the same.

It is another object of the present invention to provide a fluoropolymer composition containing the fluoropolymer.

To achieve the above objects, in an aspect of the present invention, the present invention provides a fluoropolymer represented by formula 1 below:

[Formula 1]

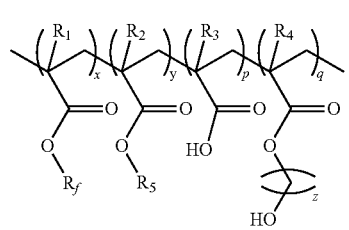

(In formula 1, $R_f$ is $C_{1-20}$ fluoridated straight alkyl or $C_{3-20}$ fluoridated branched alkyl;

$R_{1-4}$ are independently hydrogen (H), methyl ($CH_3$) or halogen group;

$R_5$ is $C_{1-20}$ straight alkyl or $C_{3-20}$ branched alkyl;

Based on the weight ratio of x+y+p+q=100, x is 45-55, y is 30-40, p is 1-10, and q is 10-20; and z is an integer of 1-5.)

In another aspect of the present invention, the present invention provides a fluoropolymer composition comprising the fluoropolymer represented by formula 1 and an organic solvent.

In another aspect of the present invention, the present invention provides a fluoropolymer film comprising the fluoropolymer represented by formula 1.

In another aspect of the present invention, the present invention provides a preparation method of a fluoropolymer film comprising the following steps:

preparing a polymer solution by dissolving the fluoropolymer in an organic solvent (step 1); and forming a polymer film by applying the polymer solution of step 1 on a substrate and drying thereof (step 2).

In another aspect of the present invention, the present invention provides an optical film comprising the fluoropolymer film.

Advantageous Effect

The fluoropolymer provided in one aspect of the present invention can obtain low surface energy and high light transmittance, and thus can be applied to various applications requiring such properties. In particular, when the fluoropolymer is coated on glass, the surface energy can be lowered to 19 mN/m or less and the light transmittance can be increased by 2% or more. At the same time, it has the effect of exhibiting excellent pencil hardness.

In addition, the fluoropolymer provided in one aspect of the present invention can be applied as a surface coating and membrane material of various products due to its high solubility in general organic solvents, despite having very low surface energy during coating.

Furthermore, the fluoropolymer has excellent adhesive power to the substrate surface and is capable of hardening, so it can be applied to various fields such as automotive glass, building exterior materials, condensers in fresh water or power plants, and solar cells.

DESCRIPTION OF THE PREFERRED EMBODIMENTS

Figure 1:
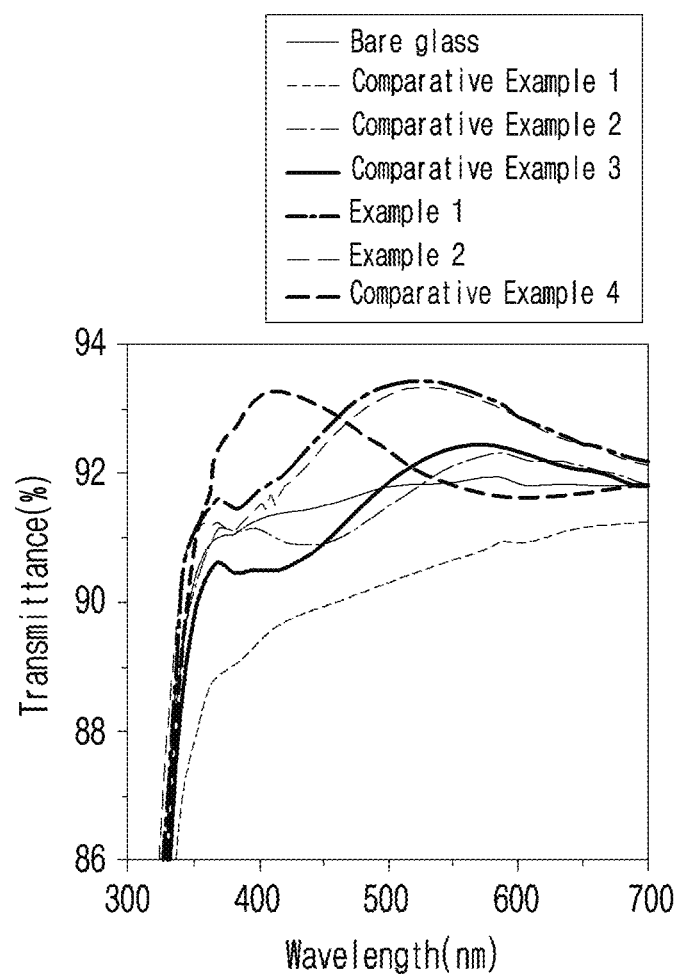
FIG. 1 is a graph showing the light transmittance of the fluoropolymer film prepared by using the fluoropolymers of Examples 1~5 and the glass substrate (Bare glass)

In an aspect of the present invention, the present invention provides a fluoropolymer represented by formula 1 below:

[Formula 1]

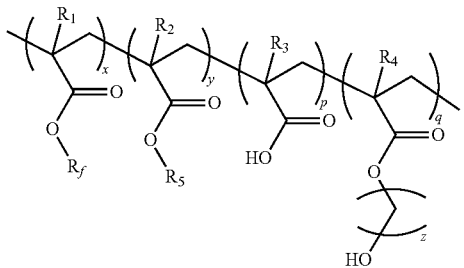

(In formula 1,
$R_f$ is $C_{1-20}$ fluoridated straight alkyl or $C_{3-20}$ fluoridated branched alkyl;
$R_{1-4}$ are independently hydrogen (H), methyl ($CH_3$) or halogen group;
$R_5$ is $C_{1-20}$ straight alkyl or $C_{3-20}$ branched alkyl;
Based on the weight ratio of x+y+p+q=100, x is 45-55, y is 30-40, p is 1-10, and q is 10-20; and
z is an integer of 1-5.)

Hereinafter, the fluoropolymer according to the present invention is described in detail.

The fluoropolymer according to the present invention can be represented by formula 1 above.

For example, in the fluoropolymer represented by formula 1, $R_f$ can be represented by $—(CH_2)_a(CF_2)_b—F$.

At this time, a can be an integer of 1~10, preferably an integer of 1~7, and more preferably an integer of 1~3. In addition, b can be an integer of 1~15, preferably an integer of 1~10, more preferably an integer of 1~5, and most preferably an integer of 1~3.

In the fluoropolymer represented by formula 1, $R_1$, $R_2$, $R_3$ and $R_4$ are independently hydrogen (H), methyl ($CH_3$) and halogen group. The halogen group can be fluorine (F) or chlorine (Cl). In the fluoropolymer represented by formula 1, $R_1$, $R_2$, $R_3$ and $R_4$ are preferably methyl.

In addition, $R_5$ in the fluoropolymer represented by formula 1 can be represented by $—(CH_2)_c—CH_3$.

At this time, c can be an integer of 1~15, preferably an integer of 1~10, and more preferably an integer of 1~5, but not always limited thereto.

In the fluoropolymer represented by formula 1, x is 45-55, y is 30-40, p is 1-10 and q is 10-20, based on the weight ratio of x+y+p+q=100.

The x is preferably 45-55, more preferably 46-54, and most preferably 47-50. The y is preferably 30-40, more preferably 32-38, and most preferably 34-36. Furthermore, p+q can be 30 or less, and 25 or less. By having the constitution in the above range, the fluoropolymer of the present invention can exhibit significantly higher pencil hardness along with lower surface energy and higher light transmittance.

As an example, the p is preferably 1-10, may be 1-8, 1-5, 1-3, and 2-3. By having the constitution in the above range, it can exhibit excellent adhesion when coated on a substrate.

In addition, the q is preferably 10-20, more preferably 12-18, and most preferably 14-16. A stable polymer film can be formed through a hardening process using the fluoropolymer according to the present invention having the constitution in the above range.

As an example, the number average molecular weight of the fluoropolymer represented by formula 1 is preferably 5,000-500,000, and more preferably 10,000-400,000. If the number average molecular weight of the fluoropolymer is less than 5,000, the thermal and mechanical strength of the polymer can be decreased, and if it exceeds 500,000, the solubility in an organic solvent can be rapidly decreased.

The polymer represented by formula 1 provided in an aspect of the present invention is very advantageous in the manufacturing process because it can be dissolved in a general organic solvent unlike the conventional fluoropolymer. As the organic solvent, any general organic solvent such as chloroform, dichloromethane, acetone, pyridine, tetrahydrofuran, chlorobenzene, and dichlorobenzene can be used without any limitation.

In addition, the fluoropolymer provided in one aspect of the present invention can be represented by the following formula 2 as an example:

[Formula 2]

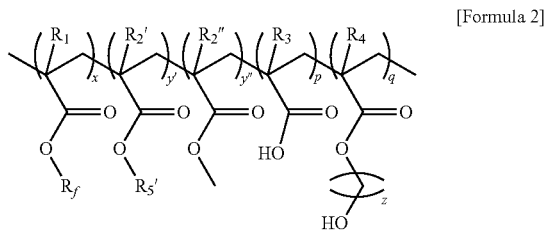

(In formula 2, $R_f$ is $C_{1-20}$ fluoridated straight alkyl or $C_{3-20}$ fluoridated branched alkyl;

$R_1$, $R_2'$, $R_2''$, $R_3$ and $R_4$ are independently hydrogen (H), methyl ($CH_3$) or halogen group;

$R_5'$ is $C_{2-20}$ straight alkyl or $C_{3-20}$ branched alkyl;

Based on the weight ratio of x+y'+y''+p+q=100, x is 45-55, y' is 22-28, y'' is 8-12, p is 1-10, and q is 10-20; and z is an integer of 1-5.)

As a specific example, in the fluoropolymer represented by formula 1, $R_f$ can be represented by —$(CH_2)_a(CF_2)_b$—F.

At this time, a can be an integer of 1~10, preferably an integer of 1~7, and more preferably an integer of 1~3. In addition, b can be an integer of 1~15, preferably an integer of 1~10, more preferably an integer of 1~5, and most preferably an integer of 1~3.

In the fluoropolymer represented by formula 2, $R_1$, $R_2'$, $R_2''$, $R_3$ and $R_4$ are independently hydrogen (H), methyl ($CH_3$) and halogen group. The halogen group can be fluorine (F) or chlorine (Cl). In the fluoropolymer represented by formula 2, $R_1$, $R_2'$, $R_2''$, $R_3$ and $R_4$ are preferably methyl.

In addition, $R_5'$ in the fluoropolymer represented by formula 2 can be represented by —$(CH_2)_d$—$CH_3$.

At this time, d can be an integer of 1~15, preferably an integer of 1~10, and more preferably an integer of 1~5, but not always limited thereto.

In the fluoropolymer represented by formula 2, x is 45-55, y' is 22-28, y'' is 8-12, p is 1-10 and q is 10-20, based on the weight ratio of x+y'+y''+p+q=100.

The x is preferably 45-55, more preferably 46-54, and most preferably 47-50. The y'+y'' is preferably 30-40, more preferably 32-38, and most preferably 34-36. Furthermore, p+q can be 30 or less, and 25 or less. By having the constitution in the above range, the fluoropolymer of the present invention can exhibit significantly higher pencil hardness along with lower surface energy and higher light transmittance.

As an example, the p is preferably 1-10, may be 1-8, 1-5, 1-3, and 2-3. By having the constitution in the above range, it can exhibit excellent adhesion when coated on a substrate.

In addition, the q is preferably 10-20, more preferably 12-18, and most preferably 14-16. A stable polymer film can be formed through a hardening process using the fluoropolymer according to the present invention having the constitution in the above range.

In another aspect of the present invention, the present invention provides a fluoropolymer composition comprising the fluoropolymer represented by formula 1 or formula 2 and an organic solvent.

Hereinafter, the fluoropolymer composition according to the present invention is described in detail.

The fluoropolymer is as described above. The fluoropolymer according to the present invention can obtain low surface energy and high light transmittance, and thus can be applied to various applications requiring these properties. As a composition for such applications, it is characterized by having high solubility in organic solvents.

The organic solvent can be chloroform, dichloromethane, acetone, pyridine, tetrahydrofuran, chlorobenzene or dichlorobenzene, but not always limited thereto.

In another aspect of the present invention, the present invention provides a fluoropolymer film comprising the fluoropolymer represented by formula 1 or formula 2.

The fluoropolymer film provided in one aspect of the present invention can exhibit very low surface energy and excellent light transmittance. In addition, the fluoropolymer film has excellent adhesive power to the substrate surface and is capable of hardening, so it can be applied to various fields such as automotive glass, building exterior materials, condensers in fresh water or power plants, and solar cells.

In another aspect of the present invention, the present invention provides a preparation method of a fluoropolymer film comprising the following steps:

preparing a polymer solution by dissolving the fluoropolymer in an organic solvent (step 1); and forming a polymer film by applying the polymer solution of step 1 on a substrate and drying thereof (step 2).

Hereinafter, the preparation method of a fluoropolymer film according to the present invention is described in detail step by step.

First, in the preparation method of a fluoropolymer film according to the present invention, step 1 is a step of preparing a polymer solution by dissolving the fluoropolymer of the present invention in an organic solvent.

Since the fluoropolymer according to the present invention has excellent solubility in an organic solvent, it can be easily dissolved in an organic solvent to prepare a polymer solution.

As an example, the organic solvent of step 1 can be chloroform, dichloromethane, acetone, pyridine, tetrahydrofuran, chlorobenzene or dichlorobenzene, but not always limited thereto.

Next, in the preparation method of a fluoropolymer film according to the present invention, step 2 is a step of forming a polymer film by applying the polymer solution of step 1 on a substrate and drying thereof.

As a specific example, the application of step 2 can be performed by methods such as spin coating, dip coating, roll coating and spray coating.

In another aspect of the present invention, the present invention provides an optical film comprising the fluoropolymer film.

In one aspect of the present invention, the optical film can have a structure in which the fluoropolymer film having a different transmittance for each light region (wavelength region) is laminated alone or in combination of two or more kinds.

In addition, in another aspect of the present invention, the optical film can further include a non-fluoropolymer film.

In another aspect of the present invention, the present invention provides a coating composition comprising the fluoropolymer represented by formula 1; an organic solvent; and at least one selected from the group consisting of pigments, dyes and additives.

In another aspect of the present invention, the present invention provides a preparation method of a coating composition comprising a step of mixing the fluoropolymer with at least one selected from the group consisting of pigments, dyes and additives, and dissolving it in an organic solvent.

Hereinafter, the present invention will be described in detail by the following examples and experimental examples.

However, the following examples and experimental examples are only for illustrating the present invention, and the contents of the present invention are not limited thereto.

<Comparative Example 1> Preparation of Fluoropolymer 1

2,2,3,3,3-Pentafluoropropyl methacrylate, stearyl methacrylate, methyl methacrylate, methacrylic acid, 2-hydroxyethyl methacrylate monomer and tetrahydrofuran (THF) were placed in a reactor according to the ratios shown in Table 1 below, followed by degassing, and vacuuming and nitrogen filling were repeated to create a nitrogen atmosphere.

Then, after raising the temperature of the reactor to 60° C., followed by stirring for about 10 minutes. Azobisisobutyronitrile (AIBN) was loaded into the reactor while maintaining a nitrogen atmosphere according to the ratio shown in Table 1 below to initiate a polymerization reaction. After the polymerization reaction was initiated, the mixture was precipitated in a mixed solvent of water/methanol for about 15 hours to give a product. The number average molecular weight and dispersity of the polymer produced for the preparation of the polymer of Comparative Example 1 are shown in Table 1 below.

TABLE 1

| Comparative Example 1 | |
| --- | --- |
| 2,2,3,3,3-pentafluoropropyl methacrylate [g] | 4 |
| stearyl methacrylate [g] | 4 |
| methyl methacrylate [g] | 8 |
| methacrylic acid [g] | 1 |
| 2-hydroxyethyl methacrylate [g] | 3 |
| azobisisobutyronitrile (AIBN) [g] | 0.408 |
| tetrahydrofuran (THF) [g] | 40 |
| molecular weight [Mn] | 73,000 |
| molecular weight distribution [PDI] | 1.9 |

<Comparative Example 2> Preparation of Fluoropolymer 2

Polymerization was performed under the same reaction conditions as described in Comparative Example 1. The content, number average molecular weight and dispersity of the reactant used for the preparation of the fluoropolymer of Comparative Example 2 are shown in Table 2 below.

TABLE 2

| Comparative Example 2 | |
| --- | --- |
| 2,2,3,3,3-pentafluoropropyl methacrylate [g] | 6 |
| stearyl methacrylate [g] | 4 |
| methyl methacrylate [g] | 6 |
| methacrylic acid [g] | 1 |
| 2-hydroxyethyl methacrylate [g] | 3 |
| azobisisobutyronitrile (AIBN) [g] | 0.408 |
| tetrahydrofuran (THF) [g] | 40 |
| molecular weight [Mn] | 78,000 |
| molecular weight distribution [PDI] | 1.9 |

<Comparative Example 3> Preparation of Fluoropolymer 3

Polymerization was performed under the same reaction conditions as described in Comparative Example 1. The content, number average molecular weight and dispersity of the reactant used for the preparation of the fluoropolymer of Comparative Example 3 are shown in Table 3 below.

TABLE 3

| Comparative Example 3 | |
| --- | --- |
| 2,2,3,3,3-pentafluoropropyl methacrylate [g] | 8 |
| stearyl methacrylate [g] | 4 |
| methyl methacrylate [g] | 4 |
| methacrylic acid [g] | 1 |

TABLE 3-continued

| Comparative Example 3 | |
| --- | --- |
| 2-hydroxyethyl methacrylate [g] | 3 |
| azobisisobutyronitrile (AIBN) [g] | 0.408 |
| tetrahydrofuran (THF) [g] | 40 |
| molecular weight [Mn] | 74,000 |
| molecular weight distribution [PDI] | 2.1 |

<Example 1> Preparation of Fluoropolymer 4

Polymerization was performed under the same reaction conditions as described in Comparative Example 1. The content, number average molecular weight and dispersity of the reactant used for the preparation of the fluoropolymer of Example 1 are shown in Table 4 below.

TABLE 4

| Example 1 | |
| --- | --- |
| 2,2,3,3,3-pentafluoropropyl methacrylate [g] | 10 |
| stearyl methacrylate [g] | 4 |
| methyl methacrylate [g] | 2 |
| methacrylic acid [g] | 1 |
| 2-hydroxyethyl methacrylate [g] | 3 |
| azobisisobutyronitrile (AIBN) [g] | 0.408 |
| tetrahydrofuran (THF) [g] | 40 |
| molecular weight [Mn] | 71,000 |
| molecular weight distribution [PDI] | 2.1 |

<Example 2> Preparation of Fluoropolymer 5

Polymerization was performed under the same reaction conditions as described in Comparative Example 1. The content, number average molecular weight and dispersity of the reactant used for the preparation of the fluoropolymer of Example 2 are shown in Table 5 below.

TABLE 5

| Example 2 | |
| --- | --- |
| 2,2,3,3,3-pentafluoropropyl methacrylate [g] | 10.4 |
| stearyl methacrylate [g] | 4 |
| methyl methacrylate [g] | 1.6 |
| methacrylic acid [g] | 1 |
| 2-hydroxyethyl methacrylate [g] | 3 |
| azobisisobutyronitrile (AIBN) [g] | 0.408 |
| tetrahydrofuran (THF) [g] | 40 |
| molecular weight [Mn] | 70,000 |
| molecular weight distribution [PDI] | 2.0 |

<Comparative Example 4> Preparation of Fluoropolymer 6

Polymerization was performed under the same reaction conditions as described in Comparative Example 1. The content, number average molecular weight and dispersity of the reactant used for the preparation of the fluoropolymer of Comparative Example 4 are shown in Table 6 below.

TABLE 6

| Comparative Example 4 | |
| --- | --- |
| 2,2,3,3,3-pentafluoropropyl methacrylate [g] | 12 |
| stearyl methacrylate [g] | 4 |

TABLE 6-continued

| Comparative Example 4 | |
| --- | --- |
| methacrylic acid [g] | 1 |
| 2-hydroxyethyl methacrylate [g] | 3 |
| azobisisobutyronitrile (AIBN) [g] | 0.408 |
| tetrahydrofuran (THF) [g] | 40 |
| molecular weight [Mn] | 98,000 |
| molecular weight distribution [PDI] | 2.9 |

Comparative Example 5

Polymerization was performed under the same reaction conditions as described in Comparative Example 1. The content, number average molecular weight and dispersity of the reactant used for the preparation of the fluoropolymer of Comparative Example 5 are shown in Table 7 below.

TABLE 7

| Comparative Example 5 | |
| --- | --- |
| 2,2,3,3,3-pentafluoropropyl methacrylate [g] | 20 |
| azobisisobutyronitrile (AIBN) [g] | 0.408 |
| tetrahydrofuran (THF) [g] | 40 |
| molecular weight [Mn] | 95,000 |
| molecular weight distribution [PDI] | 2.7 |

Comparative Example 6

A polymethylmethacrylate (PMMA) polymer was prepared.

<Experimental Example 1> Analysis of Fluoropolymer Composition

To confirm the constituents of the fluoropolymers prepared in Example 1, Example 2 and Comparative Example 4, the fluoropolymers prepared in Example 1, Example 2 and Comparative Example 4 were dissolved in chloroform (CDCl$_3$) and analyzed by NMR (Bruker AC 500P 1H NMR spectrometer). The results are shown in Table 8 below. The constituents of the polymers were calculated through the peak area ratio of the graph analyzed by nuclear magnetic resonance spectroscopy, and the results are shown in Table 8.

TABLE 8

| | Input ratio (Weight %) | Constitution ratio (Weight %) |
| --- | --- | --- |
| | A:B:C:D:E | |
| Comparative Example 1 | 20:20:40:5:15 | 21:23:37:2:16 |
| Comparative Example 2 | 30:20:30:5:15 | 29:21:29:6:15 |
| Comparative Example 3 | 40:20:20:5:15 | 42:19:19:3:17 |
| Example 1 | 50:20:10:5:15 | 48:24:11:2:15 |
| Example 2 | 52:20:8:5:15 | 54:20:10:1:15 |
| Comparative Example 4 | 60:20:0:5:15 | 61:21:0:2:16 |

A: 2,2,3,3,3-pentafluoropropyl methacrylate
B: stearyl methacrylate
C: methyl methacrylate
D: methacrylic acid
E: 2-hydroxyethyl methacrylate As shown in Table 8, it was confirmed that the constituents of the fluoropolymers prepared in Examples and Comparative Examples were similar to the monomer input ratios.

<Experimental Example 2> Evaluation of Surface Roughness, Contact Angle and Surface Energy Preparation of Fluoropolymer Film The polymers prepared in Example 1, Example 2 and Comparative Examples 1~5 were dissolved in chloroform at the concentration of 2 weight %, which was dropped onto a washed glass slide having a diameter of 1.5 cm, spin-coated at 3,000 rpm for 40 seconds, and dried in a vacuum oven at room temperature for 12 hours to prepare polymer films for the evaluation of surface roughness, contact angle and surface energy.

(1) Measurement of Surface Roughness

The surface roughness of the polymer films prepared above was measured using an atomic force microscope (SPA 400, Seiko Instruments Industry, Co., Ltd., Japan), and the results are shown in Table 9.

(2) Evaluation of Contact Angle

The contact angles of the polymer films prepared above were measured and evaluated using a contact angle meter (Kruss DSA10, Germany). The contact angles measured by dropping each of water and diiodomethane (DMI) onto the polymer films are shown in Table 7.

For reference, when the contact angle is less than 90°, spherical water droplets lose their shape on the solid surface and exhibit hydrophilicity to wet the surface. When the contact angle is more than 90°, spherical water droplets show hydrophobicity that easily flows according to external forces without soaking the surface while maintaining the sphere shape on the solid surface.

(3) Evaluation of Surface Energy

The surface energy of the polymer films prepared above was calculated. Particularly, the surface energy was calculated by Owens-Wendt-Rabel-Kaelble method after measuring the contact angle using water and diiodomethane (DMI).

TABLE 9

| | Contact angle (degree) | | Surface energy (mN/m) | Surface roughness (mN/m) |
| --- | --- | --- | --- | --- |
| | H$_2$O | diiodomethane (DMI) | | |
| Comparative Example 5 | 75.6 | 35.1 | 44.3 | <2 nm |
| Comparative Example 1 | 97.0 | 63.9 | 26.7 | <2 nm |
| Comparative Example 2 | 101.1 | 69.7 | 23.3 | <2 nm |
| Comparative Example 3 | 102.5 | 70.8 | 22.6 | <2 nm |
| Example 1 | 103.3 | 78.4 | 18.8 | <2 nm |
| Comparative Example 4 | 104.5 | 81.2 | 17.4 | <2 nm |

As shown in Table 9, while the contact angle of the polymer film prepared in Comparative Example 5 to water was 75.6°, the contact angle of the fluoropolymer film was 97° to 104.5°, which was confirmed to be excellent. In addition, while the contact angle of the polymer film prepared in Comparative Example 5 to DMI was 35.1°, the contact angle of the fluoropolymer film was 63.9° to 81.2°, which was confirmed to be excellent.

Further, as shown in Table 9, the surface energy of the polymer film prepared in Comparative Example 5 was 44.3 mN/m, while the surface energy of the fluoropolymer film was 17.4 mN/m to 26.7 mN/m, which was confirmed to have very low surface energy. In particular, it was confirmed that the surface energy of the fluoropolymer film of Comparative Example 4 was lower than that of PTFE (~18 mN/m), a polymer known to have very low surface energy.

<Experimental Example 3> Analysis of Light Transmittance

In order to confirm the light transmittance of the fluoropolymer film according to the present invention, the light transmittance of the fluoropolymer films prepared in Example 1, Example 2 and Comparative Examples 1~4, and the glass substrate (Bare glass) was measured at the wavelength range of 200 nm to 800 nm using a Varian Cary 5000 spectrometer (Agilent Technologies), and the results are shown in FIG. 1.

As shown in FIG. 1, it was confirmed that the transmittance of the fluoropolymer film prepared in Example 1 was superior to that of the glass substrate as well as other fluoropolymer films. In particular, it was confirmed that the fluoropolymer film prepared in Example 1 showed excellent transmittance at the wavelength range of 350 nm to 700 nm, and it was also confirmed that it showed more excellent transmittance at the wavelength range of 450 nm to 600 nm. In addition, it was confirmed that the transmittance of the fluoropolymer film prepared in Example 2 also showed excellent transmittance similar to that of the fluoropolymer film prepared in Example 1.

<Experimental Example 4> Analysis of Pencil Hardness

Figure 2:
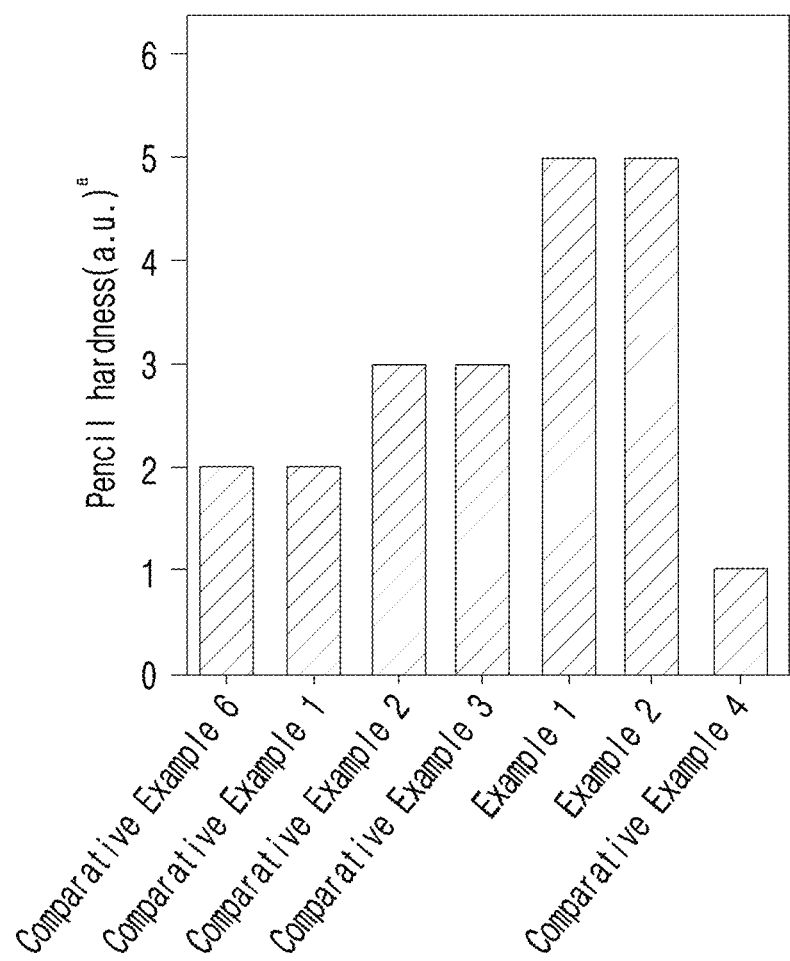
FIG. 2 is a graph showing the pencil hardness of the polymer film prepared by using the fluoropolymers of Examples 1~5 and Comparative Example 2.

In order to confirm the pencil hardness of the fluoropolymer film according to the present invention, the pencil hardness of the fluoropolymer films prepared in Example 1, Example 2 and Comparative Examples 1~4, and the polymer film prepared by using the PMMA polymer of Comparative Example 6 was measured using a hardness analyzer (BGD 506, Biuged Instruments Co., Ltd., Guangzhou), and the results are shown in FIG. 2.

As shown in FIG. 2, the pencil hardness of the fluoropolymer films prepared in Examples 1 and 2 was F(5), which was superior to that of the polymer film prepared by using the PMMA polymer of Comparative Example 6.

In addition, it was confirmed that the pencil hardness of the fluoropolymer films prepared in Examples 1 and 2 was superior to that of the fluoropolymer films prepared in Comparative Examples 1~4 whose x value in the constitution range of the fluoropolymer was out of 45-55.

As described above, it was confirmed that the fluoropolymer according to the present invention could obtain low surface energy and high light transmittance, and can be applied to various applications requiring these characteristics. In particular, it was confirmed that the fluoropolymer according to the present invention could lower the surface energy to 19 mN/m or less when coated on glass, and could increase the light transmittance by 2% or more. In addition, it was confirmed that the pencil hardness was F(5), which was superior to that of the PMMA polymer and the fluoropolymers having other constitutions. Furthermore, the fluoropolymer film of the present invention has excellent light transmittance and pencil hardness, and thus it can be widely applied as an optical application material (optical film).

In addition, the fluoropolymer provided in one aspect of the present invention can be applied as a surface coating and membrane material of various products due to its high solubility in general organic solvents, despite having very low surface energy during coating. Furthermore, the fluoropolymer has excellent adhesive power to the substrate surface and is capable of hardening, so it can be applied to various fields such as automotive glass, building exterior materials, condensers in fresh water or power plants, solar cells, and light collectors.

What is claimed is:

1. An optical film comprising:
a substrate; and
a fluoropolymer film on the substrate, the fluoropolymer film including
a fluoropolymer, the fluoropolymer being a random copolymer represented by formula 1 below:

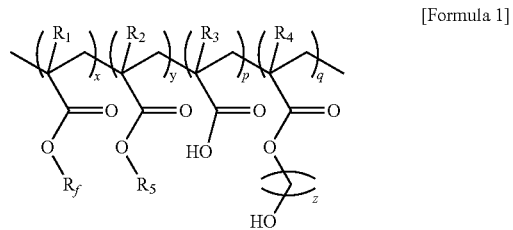

[Formula 1]

wherein
$R_f$ is $C_{1-20}$ fluoridated straight alkyl or $C_{3-20}$ fluoridated branched alkyl;
R1 to R4 are independently hydrogen (H), methyl ($CH_3$) or halogen group;
$R_5$ is $C_{1-20}$ straight alkyl or $C_{3-20}$ branched alkyl;
based on a weight ratio of x+y+p+q=100, x is 45-55, y is 30-40, p is 1-10, and q is 10-20; and
z is an integer of 1-5,
wherein the fluoropolymer film on a glass substrate has a surface energy of 19 nM/m or less.

2. The optical film according to claim 1, wherein a number average molecular weight of the fluoropolymer is 5,000 g/mol-500,000 g/mol.

3. The optical film according to claim 1, further including a non-fluoropolymer film.

4. The optical film according to claim 1,
wherein Rf is represented by formula 2 below:

$(CH_2)_a(CF_2)_bF$ [Formula 2]

wherein a is 1-10, and b is 1-10.

5. The optical film according to claim 4,
wherein a is 1-3, and b is 1-5.

6. The optical film according to claim 1,
wherein x is 48-54.

7. The optical film according to claim 1,
wherein y is 30-35.

8. The optical film according to claim 1, wherein the fluoropolymer film has been deposited on the substrate using an organic solvent including one or more of chloroform, dichloromethane, acetone, pyridine, tetrahydrofuran, chlorobenzene or dichlorobenzene.

9. A preparation method of an optical film comprising the following steps:
preparing a polymer solution by dissolving the fluoropolymer of claim 1 in an organic solvent (step 1); and
forming a polymer film by applying the polymer solution of step 1 on a substrate and drying thereof (step 2).

10. The preparation method according to claim 9, wherein the polymer solution further comprises at least one selected from the group consisting of pigments, dyes, and additives.

\* \* \* \* \*